United States Patent [19]

Hutchings et al.

[11] Patent Number: 5,268,107

[45] Date of Patent: Dec. 7, 1993

[54] MODIFIED CLINOPTILOLITE AS AN ION EXCHANGE MATERIAL

[75] Inventors: Graham J. Hutchings, Osmotherley, England; Themistoclis Themistocleous, Sandton; Richard G. Copperthwaite, Johannesburg, both of South Africa

[73] Assignee: Zeofuels Research (Proprietary) Limited, Transvaal, South Africa

[21] Appl. No.: 815,625

[22] Filed: Dec. 30, 1991

Related U.S. Application Data

[62] Division of Ser. No. 695,011, May 3, 1991, abandoned.

[30] Foreign Application Priority Data

May 9, 1990 [ZA] South Africa ............. 90/3509

[51] Int. Cl.$^5$ .............................................. C02F 1/42
[52] U.S. Cl. .................................. 210/682; 210/681; 423/712; 423/714
[58] Field of Search ............. 210/681, 682; 423/328, 423/118, 712, 714

[56] References Cited

U.S. PATENT DOCUMENTS

| | | | |
|---|---|---|---|
| 3,017,242 | 1/1962 | Amos | 23/25 |
| 3,167,504 | 1/1965 | Hayden, Jr. et al. | 210/682 |
| 3,196,106 | 7/1965 | Hayden, Jr. et al. | 210/682 |
| 3,367,884 | 2/1968 | Reid, Jr. | 502/78 |
| 3,374,182 | 3/1968 | Young | 502/78 |
| 3,553,278 | 1/1971 | Sato et al. | 502/64 |
| 3,836,561 | 9/1974 | Young | 502/85 |
| 3,907,711 | 9/1975 | Riley et al. | 423/328 |
| 4,059,543 | 11/1977 | Kiovsky et al. | 502/60 |
| 4,623,529 | 11/1986 | Sanders et al. | 423/328 |
| 4,983,560 | 1/1991 | Copperthwaite et al. | 502/85 |

FOREIGN PATENT DOCUMENTS

| | | |
|---|---|---|
| 0244922 | 11/1987 | European Pat. Off. |
| 307239 | 3/1989 | European Pat. Off. ........ 423/328 |
| 0395373 | 10/1990 | European Pat. Off. |
| 55-47143 | 4/1980 | Japan ........................ 423/328 |
| 641983 | 1/1979 | U.S.S.R. ...................... 502/85 |
| 284245 | 5/1929 | United Kingdom ............. 502/85 |

OTHER PUBLICATIONS

Ames Jr., L. L. "The Cation Sieve Properties of Clinoptilolite" Am. Minerologist vol. 45 (1960) pp. 689–700.
Ames Jr., L. L. "Cation Sieve Properties of the Open Zeolites Chabazik, Mordeite, Erionite and Clinoptilolite" Am. Minerologist vol. 46 (1961) pp. 1120–1131.
Barrer et al., "Molecular Sieve Sorbents from Clinoptilolite" Can. J. Chem. 42 (1964) pp. 1481–1487.
Mimura et al., "Processing of Radioactive Waste Solution with Zeolites, (III) Acid Resistance of Zeolites and Leachabilities of CS and Sr from Calcined Natural Zeolites" Nippon Genshiryoku Gakkaishi (1977) vol. 19, No. 3, pp. 170–176.
Gosher et al., "Selective Sorption of Caesium C–137 on a Clinoptilolite Modified by Hexaxyanoferrates (II)" Yad. Energ. (1987) vol. 24, pp. 74–81.
Dyer, "Uses of natural zeolites" Chemistry and Industry (1984), Apr. 2, pp. 241–245.
Mercer et al., "Zeolite Ion Exchange In Radioactive And Municipal Wastewater Treatment" in Natural Zeolites, Occurrence, Properties and Use, Eds. Sand and Mumpton, Oxford, Pergamon (1978), pp. 451–460.

*Primary Examiner*—R. Bruce Breneman
*Attorney, Agent, or Firm*—Cushman, Darby & Cushman

[57] ABSTRACT

An ion exchange material for the removal of radioisotope cations such as the cations of caesium and strontium from an aqueous environment containing the radioisotope cation comprises a modified clinoptilolite produced by treating a natural clinoptilolite with sodium hydroxide at a concentration of approximately 2M or with hydrochloric acid at a concentration of from 0.1 to 5M for a suitable treatment time and at a suitable treatment temperature. The modified clinoptilolite is especially effective in the removal of radioisotope cations from an aqueous environment.

18 Claims, 1 Drawing Sheet

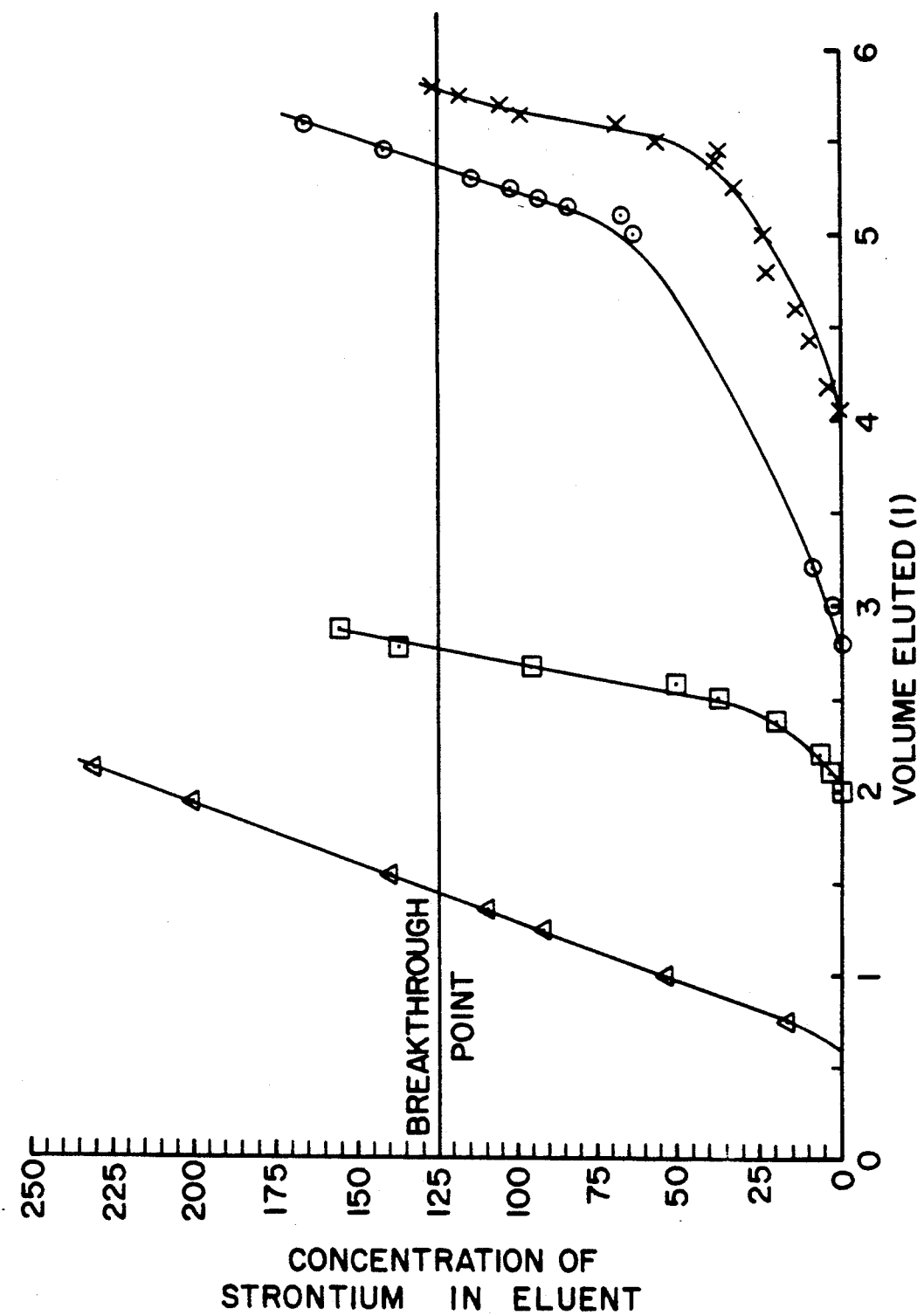

MODIFIED CLINOPTILOLITE AS AN ION EXCHANGE MATERIAL

This is a division of application Ser. No. 07/695,011, filed on May 3, 1991, which was abandoned upon the filing hereof.

BACKGROUND OF THE INVENTION

This invention relates to an ion exchange material for the removal of radioisotope cations from an aqueous environment, which comprises a modified clinoptilolite, and to a method for the removal of radioisotope cations from an aqueous environment using the modified clinoptilolite.

The successful treatment of low level radioactive effluent represents a major challenge to the nuclear industry at the present time. Such effluent can take the form of low level radioactive waste waters created by nuclear reactors, which contain the radioisotopes of strontium, $^{90}$Sr, and caesium, $^{137}$Cs, as their cations. The effluent alternatively could take the form of low and middle level radioactive waste in solid form which has to be encased or entombed in such a way as to ensure that leaking of radioisotopes by water (e.g. $^{90}$Sr or $^{137}$Cs in their cation forms) does not occur or is retarded. There exists therefore a need to identify materials that can selectively remove the radioactive cations from the aqueous environments so that these radioactive waste materials can be made safer for disposal in the environment.

Previous studies have identified that the natural zeolite, clinoptilolite, (L. L. Ames Jnr, Amer. Mineral 1960, volume 45, pages 689-700) from the Hector deposit in the USA could be used to remove $^{137}$Cs$^+$ and $^{90}$Sr$^{2+}$ from the radioactive waste waters of nuclear reactors. More recently Mercer and Ames (in "Natural zeolites, occurence, properties and use", editors: L. B. Sand and F. A. Mumpton, Oxford, Pergamon, 1978, pages 451-460) have disclosed that natural zeolites have been used in the treatment of high-level radioactive wastes to remove $^{137}$Cs$^+$; decontamination of low and medium level wastes; and the fixation of fission products with zeolites prior to long term storage.

In general radioactive effluent treatment problems vary with reactor type and location, but all reactors face the problem of containment of fission products. A particular problem for the United Kingdom is the removal of fission products released into storage ponds during the handling and storage of spent fuel elements from nuclear power reactors. The ponds contain low levels of $^{137}$Cs$^+$ and $^{90}$Sr$^{2+}$, present at less than milligram/l concentrations, as a result of corrosion of the fuel elements. Clinoptilolite as the natural mineral, particularly that from Mud Hill deposit in California, USA, has been found to be particularly successful in removing these cations from the water (See A Dyer "Uses of Natural Zeolites", Chemistry and Industry, Apr. 2, 1984, pages 241-245, for a general discussion of this application).

Although natural mineral deposits for clinoptilolite have been found to be useful in this application the zeolite is not widely utilised due to the variability of composition that is apparent. However, a few natural clinoptilolites of uniform purity and composition have been located (e.g. some deposits from Nevada, USA) and these are utilised commercially.

It has also been known to use treated clinoptilolites for the removal of caesium and strontium cations from waste solutions. In an article entitled "Selective Sorption of Caesium-137 on a Clinoptilolite Modified by Hexacyanoferrates (II), (G Goshev, K Daiev and A Aleksiev, Yad. Energ. 1987, volume 24, pages 74-81) there is disclosed the use of clinoptilolite modified with hexocyanoferrate for the removal of $^{137}$Cs form radioactive wastes. Further, in an article on Processing of Radioactive Waste Solutions with Zeolites, (H Mimura and T Kanno, Nippon Genshiryoku Gakkaishi, 1977, volume 19, No 3, pages 170-176) there is disclosed the use of a calcined natural zeolite such as clinoptilolite for the processing of radioactive waste solutions containing caesium and strontium.

Zeolites used in this application take advantage of their known resistance to radiation, in contrast to ion exchange resins which tend to lose capacity and selectivity when exposed to radiation. Zeolites also are compatible with the long term storage and disposal techniques used in the nuclear industry, since spent ion-exchange materials are usually encapsulated in cement or glass prior to long term storage or dumping of these low level wastes at sea. In addition zeolites are useful as barrier materials in the storage and containment of high level wastes when buried in trenches or underground caverns. When utilised as a barrier material the zeolite acts as an absorbent for radioisotopes that leak from the high level waste due to failure of the encapsulation media.

While natural zeolites can be used in these applications there is a continual need to identify improved materials that can be more effective in the treatment of radioactive effluent.

SUMMARY OF THE INVENTION

According to a first aspect of the invention there is provided a ion exchange material for the removal of radioisotope cations from an aqueous environment which comprises a modified clinoptilolite produced by treating a natural clinoptilolite either with a suitable alkali at a concentration greater than 0.1M for a treatment time of longer than 1 hour and at suitable treatment temperature, or with a suitable mineral acid at a concentration greater than 0.1M for a treatment time of longer than 1 hour and at a suitable treatment temperature.

According to a second aspect of the invention there is provided a cementitious composition for use in forming a structure for the containment of a material containing radioisotope cations which includes an ion exchange material as described above.

According to a third aspect of the invention there is provided a method for the removal of radioisotope cations from an aqueous environment which includes the step of contacting the aqueous environment containing the radioisotope cations with an ion exchange material comprising a modified clinoptilolite produced by treating a natural clinoptilolite either with a suitable alkali at a concentration greater than 0.1M for a treatment time of longer than one hour and at a suitable treatment temperature, or with a suitable mineral acid at a concentration greater than 0.1M for a treatment time of longer than 1 hour and at a suitable treatment temperature.

The method of the invention may be carried out by passing an aqueous solution containing the radioisotope cations through a bed containing the modified clinoptilolite. Alternatively, the method of the invention may be carried out by incorporating the modified clinoptilolite into a cementitious matrix for the containment of a material containing radioisotope cations.

The radioisotope cations are generally the cations of caesium, that is $^{137}$Cs, strontium, that is $^{90}$Sr and radium.

The modified clinoptilolite for use in the various aspects of the invention may be produced according to any one of the following routes.

The modified clinoptilolite may be produced by:
(a) treating a natural clinoptilolite with:
  (i) a suitable alkali at a concentration of greater than 0.1M for a treatment time of longer than 1 hour and at a suitable treatment temperature, or
  (ii) a suitable mineral acid at a concentration of greater than 0.1M for a treatment time of longer than 1 hour at a suitable treatment temperature; and
(b) washing the product of step (a); to produce the modified clinoptilolite.

The modified clinoptilolite may also be produced by carrying out steps (a)(i) and (b) and thereafter:
(c) treating the product of step (b) with a suitable mineral acid at a concentration of greater than 0.1M for a treatment time of longer than 1 hour and at a suitable treatment temperature;
(d) washing the product of step (c); to produce the modified clinoptilolite.

The modified clinoptilolite may also be produced by carrying out steps (a)(i), (b), (c), (d) and thereafter:
(e) treating the product of step (d) with a suitable alkali at a concentration greater than 0.1M for a treatment time of longer than 1 hour and at a suitable treatment temperature; and
(f) washing the product of step (e); to produce the modified clinoptilolite.

The modified clinoptilolite may also be produced by carrying out steps (a)(i) and (b) and thereafter:
(g) treating the product of step (b) with a suitable alkali at a concentration greater than 0.1M for a treatment time of longer than 1 hour and at a suitable treatment temperature; and
(h) washing the product of step (g); to produce the modified clinoptilolite.

The modified clinoptilolite may also be produced by carrying out steps (a)(ii) and (b) and thereafter:
(i) treating the product of step (b) with a suitable alkali at a concentration of greater than 0.1M for a treatment time of longer than 1 hour and at a suitable treatment temperature; and
(j) washing the product of step (i); to produce the modified clinoptilolite.

Steps (i) and (j) may be followed by additional treatment steps with a suitable alkali or a suitable mineral acid, as set out above.

After the production of the modified clinoptilolite as described in any one of the above paragraphs, the modified clinoptilolite is preferably calcined at a suitable calcining temperature of from 400° C. to 500° C. for a suitable calcining time of from 3 hours.

In all the methods for the production of the modified clinoptilolite, the suitable alkali is preferably sodium hydroxide at a concentration of from 0.5M up to and including 5M, more preferably 2M to 5M, the treatment temperature is preferably from 30° C. to 80° C. inclusive, and the treatment time is preferably from longer than 1 hour up to and including 48 hours.

The suitable mineral acid for use in all the methods for the production of a modified clinoptilolite is preferably hydrochloric acid at a concentration of from greater than 0.1N, preferably from greater than 1M up to and including 5M, preferably from greater than 1M up to and including 2.5M the treatment temperature is preferably from 20° C. to 80° C. inclusive and the treatment time is preferably from longer than 1 hour up to and including 48 hours.

The starting natural clinoptilolite may be any suitable natural clinoptilolite such as that from Zululand, South Africa or that from Fatatsui, Japan.

BRIEF DESCRIPTION OF THE DRAWING

The drawing is a graph of breakthrough curves for strontium according to Example 5.

DESCRIPTION OF EMBODIMENTS

The first aspect of the invention is an ion exchange material for the removal of radioisotope cations, preferably the cations of caesium, strontium and radium, from an aqueous environment such as a waste water solution resulting from a nuclear process or an aqueous solution containing cations produced in a containment site for radioactive waste material. The ion exchange material is a modified clinoptilolite produced by treating a natural clinoptilolite of any suitable type, either with a suitable alkali at a concentration greater than 0.1M for a treatment time of longer than 1 hour and at a suitable treatment temperature, or with a suitable mineral acid at a concentration greater than 0.1M for a treatment time of longer than 1 hour and at a suitable treatment temperature.

Although the basic step for the production of the modified clinoptilolite, is treatment of the natural clinoptilolite with a suitable alkali or with a suitable acid at a suitable concentration and at a suitable temperature and for a suitable time, this step may be preceded or followed by other steps to product preferred modified clinoptilolites. Various treatment methods for the production of the modified clinoptilolite are set out below.

Method 1
(a)(i) treating a natural clinoptilolite with:
  (i) a suitable alkali at a concentration greater than 0.1M for a treatment time of longer than 1 hour and at a suitable treatment temperature, or
  (ii) a suitable mineral acid at a concentration greater than 0,1M for a treatment time of longer than 1 hour and at a suitable treatment temperature; and
(b) washing the product of step (a), to produce the modified clinoptilolite.

Method 2
After steps (a)(i) and (b):
(c) treating the product of step (b) with a suitable mineral acid at a concentration of greater than 0.1M for a treatment time of longer than 1 hour and at a suitable treatment temperature; and
(d) washing the product of step (c), to produce the modified clinoptilolite.

Method 3
After steps (a)(i), (b), (c) and (d):
(e) treating the product of step (d) with a suitable alkali at a concentration greater than 0.1M for a treatment time of longer than 1 hour and at a suitable treatment temperature; and
(f) washing the product of step (e), to produce the modified clinoptilolite.

Method 4

After steps (a)(i) and (b):

(g) treating the product of step (b) with a suitable alkali at a concentration greater than 0.1M for a treatment time of longer than 1 hour and at a suitable treatment temperature; and (h) washing the product of step (g), to produce the modified clinoptilolite.

Method 5

After steps (a)(ii) and (b):

(i) treating the product of step (b) with a suitable alkali at a concentration of greater than 0.1M for a treatment time of longer than 1 hour and at a suitable treatment temperature; and (j) washing the product of step (i); to produce the modified clinoptilolite.

After any one of methods 1 to 5 above, the modified clinoptilolite is preferably calcined at a suitable calcining temperature of 400° C. to 500° C. for a suitable calcining time from 3 hours.

The preferred suitable alkali is sodium hydroxide at a concentration of from 0.5M up to and including 5M, more preferably 2M to 5M,, the treatment temperature is preferably from 30° C. to 80° C. inclusive, and the treatment time is preferably from longer than 1 hour up to and including 48 hours.

The suitable mineral acid is preferably hydrochloric acid at a concentration from greater than 0.1M, preferably from greater than 1M up to and including 5M, preferably from greater than 1M up to and including 2.5M, the treatment temperature is preferably from 20° C. to 80° C. inclusive, and the treatment time is preferably from longer than 1 hour to and including 48 hours.

Preferred methods for the production of a modified clinoptilolite are disclosed in European Patent Applications Nos. 90304429.5 and 88308373.5.

The second aspect of the invention is a method for the removal of radioisotope cations from an aqueous environment including the step of contacting the aqueous environment containing the radioisotope cations with an ion exchange material which comprises a modified clinoptilolite produced as set out above.

The step of contacting the aqueous environment containing the radioisotope cations with the modified clinoptilolite may be achieved by passing an aqueous solution containing the radioisotope cations through a bed containing the modified clinoptilolite. The bed may be a fixed bed of the modified clinoptilolite and use may be made of either upflow or downflow conditions, and a temperature of ambient or higher may be utilized.

Alternatively, the step of contacting the aqueous environment containing the radioisotope cations with the modified clinoptilolite may be achieved by incorporating the modified clinoptilolite into a cementitious matrix commonly used for the containment of a material containing the ratioisotope cations, for example radioactive waste materials. As the water present in the environment leaches the radioisotope cations from the waste material, the modified clinoptilolite in the cementitious matrix removes the radioisotope cations from the aqueous solution thus neutralising them.

It has been found that a modified clinoptilolite, modified by treatment with a suitable mineral acid, optionally with a treatment with a suitable alkali is especially useful for the removal of Cs cations from an aqueous environment, while a modified clinoptilolite modified by treatment with a suitable alkali, optionally with a treatment with a suitable mineral acid is especially useful for the removal of Sr cations from an aqueous environment.

Examples of the modification of a natural clinoptilolite and its use as an ion exchange material for the removal of strontium and caesium cations from aqueous solutions will now be given.

EXAMPLE 1

Natural clinoptilolite from Zululand, South Africa (50 g) was stirred in 2M aqueous sodium hydroxide (500 ml) at 50° C. for 8 hours. The sample was subsequently washed with de-ionised water and then stirred in 0.5M aqueous hydrochloric acid (500 ml) at 60° C. for 15 hours. The modified clinoptilolite was dried (120° C. for 3 hours) and calcined (400° C. for 4 hours). The modified clinoptilolite was denoted MC-1.

EXAMPLE 2

Modified clinoptilolite MC-1 was converted to the sodium form by ion exchanging with a 2M sodium hydroxide solution (500 ml) at 50° C. for 8 hours. The modified clinoptilolite was washed with de-ionised water, dried at 120° C. for 3 hours and calcined at 400° C. for 4 hours. The modified clinoptilolite was denoted MC-2.

EXAMPLE 3

Natural clinoptilolite from Zululand, South Africa (20 g) was stirred in 2M aqueous sodium hydroxide (500 ml) at 50° C. for 8 hours. The material was filtered, washed with de-ionised water, and the whole procedure was repeated a further time. The washed material was dried at 120° C. for 3 hours and calcined at 400° C. for 4 hours. The modified clinoptilolite was denoted MC-3.

EXAMPLE 4

Natural clinoptilolite from Zululand, South Africa (50 g) was stirred in 5M aqueous sodium hydroxide (500 ml) at 50° C. for 8 hours. The material was then filtered and washed with de-ionised water, dried at 120° C. for 3 hours and then calcined at 400° C. for 4 hours. The modified clinoptilolite was denoted MC-4.

EXAMPLE 5

This example demonstrates the efficacy of the modified clinoptilolite in the removal of strontium ions, $Sr^{2+}$, by ion exchange, from aqueous solution. Samples (0.3 g) of the modified clinoptilolite prepared in examples (1–4) (particle size 120–200 $\mu$m) were separately supported in a plug of glass wool and were contained within glass tubes of 0.8 cm internal diameter and 10 cm in length. The modified clinoptilolites were initially wetted with 1.5 ml of de-ionised water and air bubbles were removed using an electronic vibrator. A standard solution of strontium bromide ($SrBr_2$) of concentration $2.5 \times 10^{-5}$ molar was then pumped up through the modified clinoptilolites at a rate of 24 ml/hour using a Gilson minipulse peristaltic pump. The effluent solution was collected in 12 ml aliquots using an ISCO 1850 fraction collector. These samples were subsequently analysed by emission spectroscopy using a Varian AA-1275 series atomic absorption spectrophotometer.

The breakthrough curves for strontium are shown in FIG. 1 for the modified clinoptilolite samples. The breakthrough point is defined at $$C_v = 0.5$$

Where
$C_v$ = concentration of $Sr^{2+}$ at volume v
$C_0$ = initial concentration of $Sr^{2+}$ i.e. $2.5 \times 10^{-5}$ molar The breakthrough point for modified clinoptilolite MC-1 was observed after 1.45 l of the standard strontium bromide solution had been passed whereas that for MC-2 was observed at 2.775 l. The breakthrough points for modifications MC-3 and MC-4 represented the best results, these being observed after 5.375 l (MC-3 and 5.799 l (MC-4) of the standard strontium bromide solution has been eluted. In addition no $Sr^{2+}$ was evident in the effluent from Sample MC-4 until 4 l of the standard strontium bromide solution has been processed. This example therefore demonstrates that modification of the natural zeolite can prepare materials which are highly selective for $Sr^{2+}$ cations and also exhibit a high ion exchange capacity. A similar set of experiments using caesium nitrate solution ($2.5 \times 10^{-5}$M) demonstrated that the modified clinoptilolite samples were also effective for the removal of caesium cations from aqueous solutions.

We claim:

1. A method for the removal of radioisotope cations from an aqueous environment which includes the step of contacting the aqueous environment containing the radioisotope cations with an ion exchange material which comprises a modified clinoptilolite produced by:
   (a) treating a natural clinoptilolite with:
      (i) an alkali at a concentration of greater than 0.1M for a treatment time of longer than 1 hour, or
      (ii) a mineral acid at a concentration greater than 0.1M for a treatment time of longer than 1 hour; and
   (b) washing the product of step (a); to produce the modified clinoptilolite.

2. A method according to claim 1 wherein an aqueous solution containing the radioisotope cations is passed through a bed containing the ion exchange material.

3. A method according to claim 1 wherein the ion exchange material is incorporated into a cementitious matrix for the containment of a material containing the radioisotope cations and in that the ion exchange material removes the radioisotope cations leached from the material by an aqueous solution.

4. A method according to claim 1 wherein the modified clinoptilolite is produced by carrying out steps (a)(i) and (b).

5. A method according to claim 1 wherein the modified clinoptilolite is produced by carrying out steps (a)(ii) and (b).

6. A method according to claim 1 wherein the modified clinoptilolite is produced by carrying out steps (a)(i) and (b) and thereafter:
   (c) treating the product of step (b) with a suitable mineral acid at a concentration of greater than 0.1M for a treatment time of longer than 1 hour; and
   (d) washing the product of step (c).

7. A method according to claim 6 wherein the modified clinoptilolite is produced by carrying out steps (a)(i), (b), (c) and (d) and thereafter:
   (e) treating the product of step (d) with an alkali at a concentration greater than 0.1M for a treatment time of longer than 1 hour; and
   (f) washing the product of step (e).

8. A method according to claim 1 wherein the modified clinoptilolite is produced by carrying out steps (a)(i) and (b) and thereafter:
   (g) treating the product of step (b) with an alkali at a concentration greater than 0.2M for a treatment time of longer than 1 hour; and
   (h) washing the product of step (g).

9. A method according to claim 1 wherein the modified clinoptilolite is produced by carrying out steps (a)(ii) and (b) and thereafter:
   (i) treating the product of step (b) with an alkali at a concentration of greater than 0.1M for a treatment time of longer than 1 hour; and
   (j) washing the product of step (i).

10. A method according to claim 1 wherein the modified clinoptilolite is calcined at a temperature of from 400° C. to 500° C. for a calcining time of at least 3 hours.

11. A method according to claim 1 wherein the alkali is sodium hydroxide at a concentration of from 0.5M up to and including 5M.

12. A method according to claim 7 wherein the alkali is sodium hydroxide at a concentration of from 0.5M up to and including 5M.

13. A method according to claim 8 wherein the alkali is sodium hydroxide at a concentration of from 0.5M up to and including 5M.

14. A method according to claim 9 wherein the alkali is sodium hydroxide at a concentration of from 0.5M up to and including 5M.

15. A method according to claim 1 wherein in step (a)(i) a treatment temperature of from 30° C. to 80° C. inclusive is employed and the treatment time is from longer than 1 hour up to and including 48 hours.

16. A method according to claim 1 wherein the mineral acid is hydrochloric acid at a concentration of from greater than 0.1M up to and including 5M.

17. A method according to claim 6 wherein the mineral acid is hydrochloric acid at a concentration of from greater than 0.1M up to and including 5M.

18. A method according to claim 1 wherein in step (a)(ii) a treatment temperature of from 20° C. to 80° C. inclusive is employed and the treatment time is from longer than 1 hour up to and including 48 hours.

* * * * *